(12) United States Patent
Tanabe et al.

(10) Patent No.: US 7,980,510 B2
(45) Date of Patent: Jul. 19, 2011

(54) SMALL UNMANNED AIRCRAFT

(75) Inventors: Yasutada Tanabe, Tokyo (JP); Chiharu Totsuka, Tokyo (JP); Takeshi Akasaka, Tokyo (JP); Masato Okamoto, Wakayama (JP)

(73) Assignee: Kawada Industries, Inc., Tokyo (JP)

( * ) Notice: Subject to any disclaimer, the term of this patent is extended or adjusted under 35 U.S.C. 154(b) by 142 days.

(21) Appl. No.: 10/569,653

(22) PCT Filed: May 12, 2004

(86) PCT No.: PCT/JP2004/006390
§ 371 (c)(1),
(2), (4) Date: Oct. 6, 2006

(87) PCT Pub. No.: WO2005/019028
PCT Pub. Date: Mar. 3, 2005

(65) Prior Publication Data
US 2007/0063096 A1  Mar. 22, 2007

(30) Foreign Application Priority Data
Aug. 25, 2003 (JP) .................................. 2003-299869

(51) Int. Cl.
*B64C 11/46* (2006.01)
*B64D 27/00* (2006.01)
*B64D 33/00* (2006.01)

(52) U.S. Cl. ........................... 244/55; 244/105; 244/903

(58) Field of Classification Search ................ 244/35 R, 244/36, 87, 119, 13, 55, 215, 91, 155 A, 101, 244/105, 903, 159.1, 159.3, 900, 901, 45 A, 244/23 R, 52, 106, 69, 92, 51, 54; 446/57, 446/58; 440/37; D12/333, 324, 305; 248/554
See application file for complete search history.

(56) References Cited

U.S. PATENT DOCUMENTS
1,431,244 A * 10/1922 Mendel ........................... 244/55
(Continued)

FOREIGN PATENT DOCUMENTS
FR            2 452 426        10/1980

OTHER PUBLICATIONS

Neuhart, D. H., and Pendergraft, O. C. "A Water Tunnel Study of Gurney Flaps." NASA Technical Memorandum 4071 [online], Nov. 1988 [retrieved online on Mar. 26, 2008]. Retrieved from the Internet: <http://ntrs.nasa.gov/archive/nasa/casi.ntrs.nasa.gov/19890004024_1989004024.pdf>.*

(Continued)

*Primary Examiner* — Tien Dinh
*Assistant Examiner* — Richard R Green
(74) *Attorney, Agent, or Firm* — Kenneth H. Ohriner; Perkins Coie LLP

(57) ABSTRACT

A small unmanned airplane includes; a main wing having a camber airfoil whose under surface is approximately flat, narrowing in the shape of taper to a blade tip, leading edge of which holds sweepback angle, of flying wing type which has an aerodynamic surface of tailless wing type and is low aspect ratio; movable flaps extending approximately extreme breadth in trailing edge part of both left and right sides of the main wing, having a dihedral angle at least in level flight; vertical stabilizers placed at blade tips of left and right of the main wing; and two propellers installed on the top surface of the main wing. This can materialize miniaturization and weight saving of a small unmanned airplane for individual carrying capability and for suitability for such as lift-off by hand throw.

15 Claims, 8 Drawing Sheets

U.S. PATENT DOCUMENTS

| | | | | |
|---|---|---|---|---|
| 1,842,125 | A * | 1/1932 | Schwarz | 244/51 |
| 1,893,129 | A * | 1/1933 | Charpentier | 244/35 R |
| 1,915,055 | A * | 6/1933 | Fauvel | 244/35 R |
| 1,987,050 | A | 1/1935 | Burnelli | |
| 3,536,278 | A * | 10/1970 | Walley | 244/171.8 |
| 4,019,699 | A * | 4/1977 | Wintersdorff et al. | 244/121 |
| 4,151,893 | A * | 5/1979 | Mantle | 244/23 R |
| 4,180,221 | A * | 12/1979 | Harris | 244/13 |
| 4,478,378 | A * | 10/1984 | Capuani | 244/55 |
| 4,714,215 | A * | 12/1987 | Jupp et al. | 244/199.4 |
| 4,867,396 | A * | 9/1989 | Wainfan | 244/215 |
| 6,102,332 | A * | 8/2000 | Haxton et al. | 244/118.2 |
| 6,138,957 | A | 10/2000 | Nastasi et al. | |
| 6,293,493 | B1 * | 9/2001 | Eichstedt et al. | 244/30 |
| 2002/0096600 | A1 * | 7/2002 | Richards | 244/105 |
| 2003/0080243 | A1 * | 5/2003 | Hoisignton et al. | 244/13 |

OTHER PUBLICATIONS

Grasmeyer, J. M., and Keennon, M. T. "Development of the Black Widow Micro Air Vehicle." AIAA-2001-0127. Published by the American Institute of Aeronautics and Astronautics. Copyright 2001, Joel M. Grasmeyer.*

Kellogg, J., et al. "The NRL MITE Air Vehicle." [retrieved online on Mar. 26, 2008]. Retrieved from the Internet: <http://web.archive.org/web/20031203081002/http://www.cs.uwyo.edu/~wspears/papers/nrl.mite.pdf>. The paper appears to have been given at a conference in 2001; the examiner cannot verify the paper online until Dec. 2003.*

Kellogg, J. "MITE (Micro Tactical Expendable)." [retrieved online on Mar. 26, 2008] Retrieved from the Internet: <http://www.nrl.navy.mil/techtransfer/exhibits/pdfs/Info%20Sheet%20pdfs/UAV%20Info%20Sheets/MITE.pdf>.*

International Search Report for International Application No. PCT/JP2004/006390, Dated Aug. 17, 2004, 2 page(s).

* cited by examiner

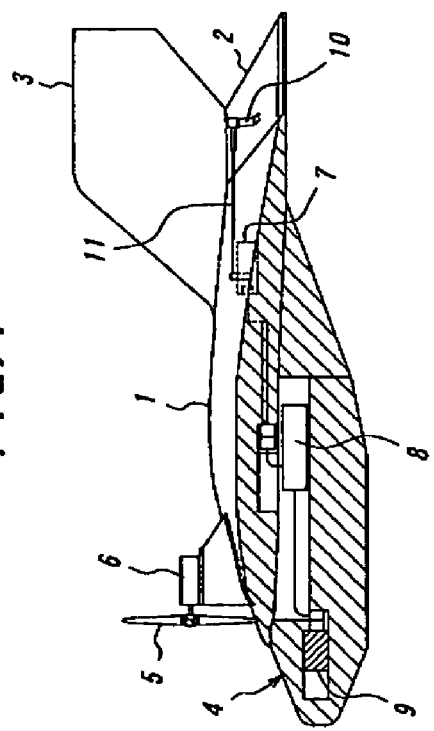
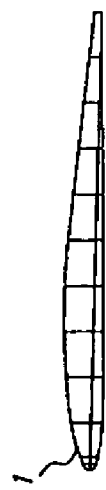
FIG. 7
FIG. 8a
FIG. 8b

SMALL UNMANNED AIRCRAFT

This application is a national stage filing under 35 U.S.C. 371 of International Application PCT/JP2004/006390, filed on May 12, 2004. International Application PCT/JP2004/006390 was published under No. WO 2005/019028 on Mar. 3, 2005.

FIELD OF THE INVENTION

The present invention relates to a small unmanned airplane of the remote-control type of such as radio guidance or of the autonomy type used by monitoring, observation, communication relay, and so on.

BACKGROUND ART

In general, aircraft having a fixed wing have a wing form including a main wing in the fuselage part and a tail assembly at back-end side of the fuselage part, and for this case, the main aerodynamic lift to make the airframe rise generates in the main wing, and the tail assembly is used for sustainment of attitude stability of the airframe and for flight control.

In addition, aircraft having a fixed wing include an airplane called a flying wing or a tailless airplane that consists of only a main wing. There are many airframes which adopt a tailless airplane structure in a field of unmanned airplanes aimed at miniaturization, in such an unmanned airplane, an propeller to get propulsion power is installed in height almost same as alar part, in addition, in small unmanned airplanes which take off by such as hand throw, it is unfavorable to have a landing device such as wheels and skids so as to avoid increasing the weight of the airframe structure, therefore, there are many unmanned airplanes which make the airframe land by means of such as belly-landing and intentional falling caused by a stall.

However, in the architecture which includes a main wing in the fuselage part and a tail assembly at back-end side of the fuselage part, because of a structure of a airframe to achieve aerodynamic characteristics, a certain distance (space) must be set in physical relationship with the main wing and the tail assembly, therefore, there is a problem that over-all length becomes long in anterioposterior of the airframe. In addition, a main wing span also tends to relatively get longer as length of the anterioposterior, and this becomes a big problem against miniaturization of the unmanned aircraft whose development is being advancing for personal carrying and other purpose in late years.

On the other hand, in flying wings or tailless airplanes which consist of only a main wing, when the airframe is made land by means of such as belly-landing and intentional falling because of stall, there is a problem that propulsion mechanisms such as propellers are damaged by the shock of a landing as if it is natural. Because of this, many airframes that do not premise recycling of them are commonly found.

The present invention can solve the above-mentioned assignments profitably, and aims at materializing miniaturization and weight saving for individual carrying capability and for suitability for such as lift-off by hand throw, and at providing small unmanned airplanes that have enough flight stability, and that are not damaged easily in landing such as belly-landing.

DESCRIPTION OF THE INVENTION

The small unmanned airplane of the present invention which achieve above-mentioned purposes includes a main wing of flying wing type having an aerodynamic surface of tailless airplane type, a flap for the attitude control installed in trailing edge part of both left and right sides of the main wing, a vertical stabilizer installed in both end parts of the main wing or at the middle part of the top surface of the wing, and at least one propulsion means installed on the top surface of the main wing.

The small unmanned airplane of the present invention, for example, takes off by means of such as lift-off by hand throw or with a launcher, gets a thrust by the propulsion means, stabilizes a direction by the vertical stabilizer, performs such as ascent and descent and turning by means of actuation of the flap and by means of adjustment of a thrust of the propulsion means, and lands or alights on the water by means of belly-landing.

Therefore, according to the small unmanned airplane of the present invention, free flight is possible, besides, by having a main wing of flying wing type, an over-all length shortens and an extreme breadth is stayed, therefore, it can materialize miniaturization and weight saving for individual carrying capability and for suitability for such as lift-off by hand throw, in addition, because the propulsion means installed on a top surface of a main wing accelerates air current on the top surface of the main wing, big aerodynamic lift can be obtained, furthermore, flight stability of the airframe can be obtained by means of a flap controlling an attitude of the airframe. In here, if the flap has a dihedral angle at least in level flight, the flap turns air current on a top surface of the main wing to the backward and obliquely upward at least in level flight, therefore, a head lowering moment at the time of thrust increase matches with a back lowering moment and flight stability of an airframe can be improved.

In addition, according to the small unmanned airplane of the present invention, because of having a main wing of flying wing type, if the main wing has a low aspect ratio by narrowing in the shape of taper to a blade tip and holding at the leading edge a sweepback angle, a stall can be restrained when elevation angle of the airframe grew big, and aerodynamic stability can be obtained easily when gust or rapid control of the airframe occurs, and if the main wing has camber airfoil whose inferior surface becomes approximately flat, it makes a glide in landing or alighting on the water smooth and can prevent the damage of the airframe effectively.

As well in the small unmanned airplane of the present invention, the main wing may have a dihedral angle in left and right part for the middle. With this constitution, lateral-stability of the airframe can be obtained and when an attitude angle of bilateral direction of the airframe declines in landing or alighting on the water, a touch-down and alighting on the water from a blade tip part can be avoided and the damage of the airframe can be minimized.

In addition, in the small unmanned airplane of the present invention, the main wing may have a cross-sectional shape that is a similar figure from a wing root part (middle part) to a blade tip and narrows linearly in the shape of taper from a wing root part to a blade tip. With this constitution, at the time of manufacturing, preparation of only actual shape gages of a cross section of a wing root part and a cross section of a blade tip enables to form aerofoil surfaces with straight lines binding them radiatively. Thus, for example, when main structure materials of an interior of the wing are such as Styrofoam, the main wing can be easily cut and brought down with a heat wire cutter.

In addition, pasting of such as vinyl polymers film to a surface of a structural material cut and brought down as a stiffener of the main wing can be performed easily.

Furthermore, in the small unmanned airplane of the present invention, the flap may be a fixed flap and the propulsion means may be installed at left and right of the top surface of the main wing. With this constitution, by adjustment of a thrust of the propulsion means, flight control is enabled. In other words, by control of a thrust of the propulsion means of left and right, ascent and descent flight are attained in increase and decrease of a total thrust and a direction turning is attained by difference of the left and right thrust, therefore, high mobility can be realized without need to equip such as actuator mechanisms for steering, components of a airframe can be minimized, and a more small and light unmanned airplane can be constituted.

Furthermore, in the small unmanned airplane of the present invention, the flap may be a movable flap and the propulsion means may be installed at left and right or at middle part of the top surface of the main wing. With this constitution, by angle adjustment of the movable flaps of left and right, flight control can be attained. In other words, by control of an angle of the movable flaps of left and right, ascent and descent flight s by control of an attitude angle of a pitching direction of a airframe by means of raising and lowering the movable flaps of left and right in a same direction at the same time and direction turning can be attained by control of an attitude angle of a rolling direction of the airframe by means of raising and lowering the movable flaps of left and right in a reverse direction each other at the same time. And, control of the movable flaps of left and right and control of a thrust of the propulsion means of left and right may be associated. With this constitution, the unmanned airplane having higher mobility, having high flight performance or having high controllability, can be realized.

Furthermore, in the small unmanned airplane of the present invention, the propulsion means is a propeller which is rotationally driven by means of a drive source, the propeller may be placed so that the lowest point of the revolution of the propeller is higher than an under surface of the main wing. With this constitution, because the propeller does not protrude in an under surface of the main wing, in landing or alighting on the water, the propeller can be avoided touching grass or ground or water surface and the damage of the airframe can be minimized.

Furthermore, in the small unmanned airplane of the present invention, a rotation axis of the propeller, for a frontal direction of the wing, may face to diagonal right when the propeller rotates clockwise seeing from a point in front of the main wing, and may face to diagonal left when the propeller rotates counterclockwise seeing from a point in front of the main wing. With this constitution, slippages of the propeller wake flow on the top surface of the main wing by twist of the flow are corrected and the propeller wake flow can be turned to a desired direction.

Furthermore, in the small unmanned airplane of the present invention, the fuselage extending in anterioposterior may be placed at the middle part of the under surface of the main wing, a storing bay may be formed in the interior of the fuselage, and the bottom of the fuselage may be formed in the shape of a skid. With this constitution, such payloads as batteries and a control computer, various kinds of sensors, and/or a camera can be stored in the storing bay of the interior of the fuselage, besides, an effective surface for a touch-down or for alighting on the water can be formed by the bottom of the fuselage whose form is a skid such as a single skid or a double skid, it makes a glide in landing or alighting on the water smooth and can prevent the damage of the airframe effectively. As well, a bottom of the fuselage may be covered with a film of abrasion resistance and so on. With this constitution, a damage of the airframe can be prevented effectively in landing or alighting on the water.

And, in the small unmanned airplane of the present invention, at least a bottom of the fuselage may be made from a buffer material such as Styrofoam. With this constitution, shock in landing or alighting on the water can be absorbed and a damage of the airframe can be prevented effectively.

BRIEF DESCRIPTION OF THE DRAWINGS

FIG. 7 depicts a perspective sectional view along the line A-A of FIG. 6 showing the control system of the small unmanned airplane of the above-mentioned embodiment.

FIG. 8(*a*) and FIG. 8(*b*) depict perspective sectional views showing respectively the blade cross-sectional shape of the middle part and of a blade tip of the main wing of the small unmanned airplane of the above-mentioned embodiment.

BEST MODE FOR CARRYING OUT THE INVENTION

Figure 1:
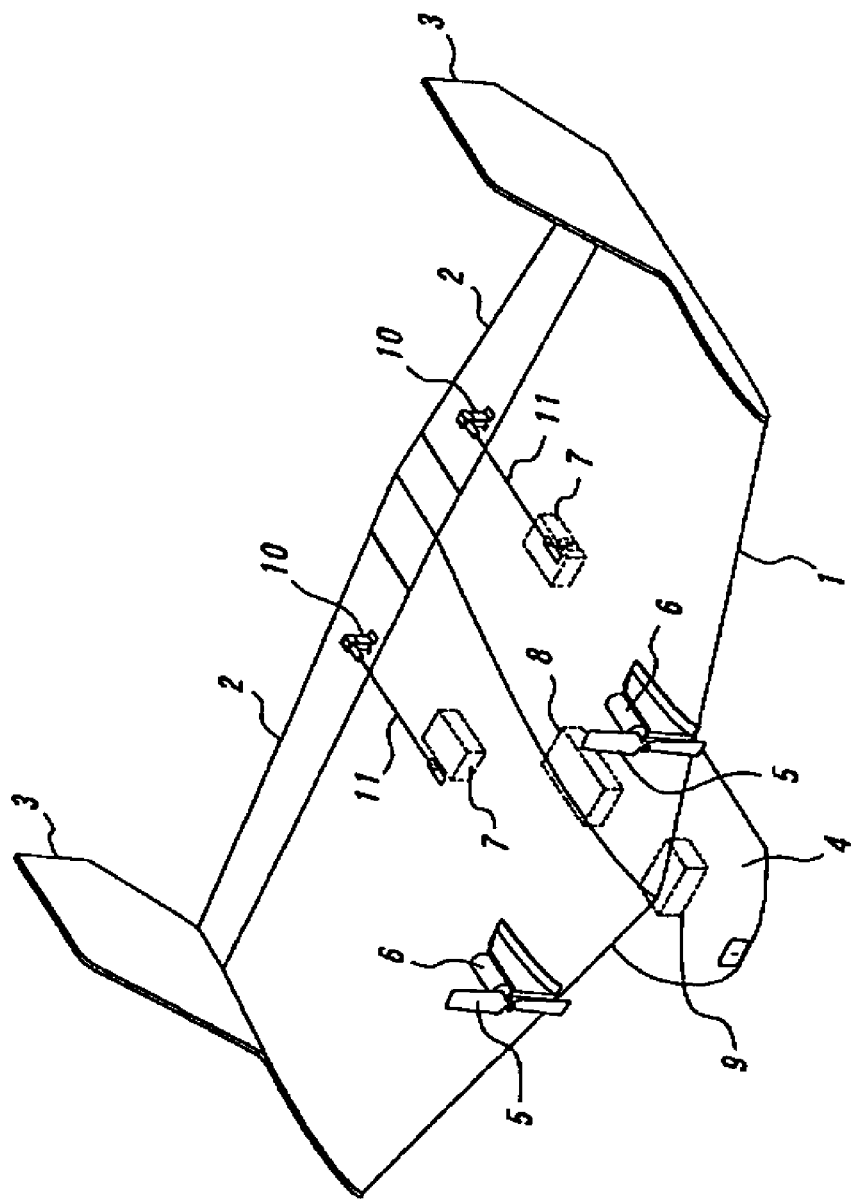
FIG. 1 depicts a perspective view showing one embodiment of the small unmanned airplane of the present invention seeing from a diagonal front and upper point.
Figure 2:
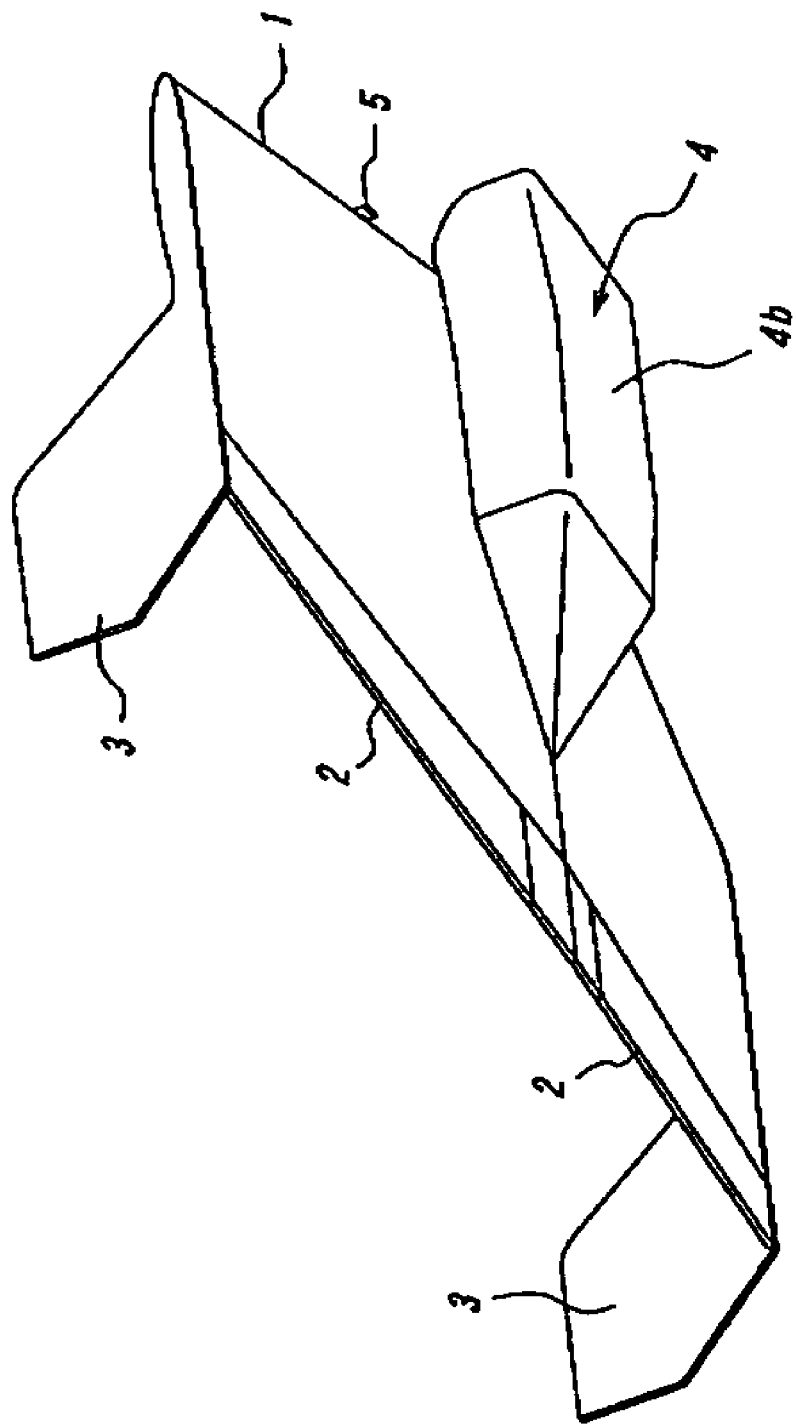
FIG. 2 depicts a perspective view showing the small unmanned airplane of the above-mentioned embodiment seeing from a diagonal rear and lower point.
Figure 3:
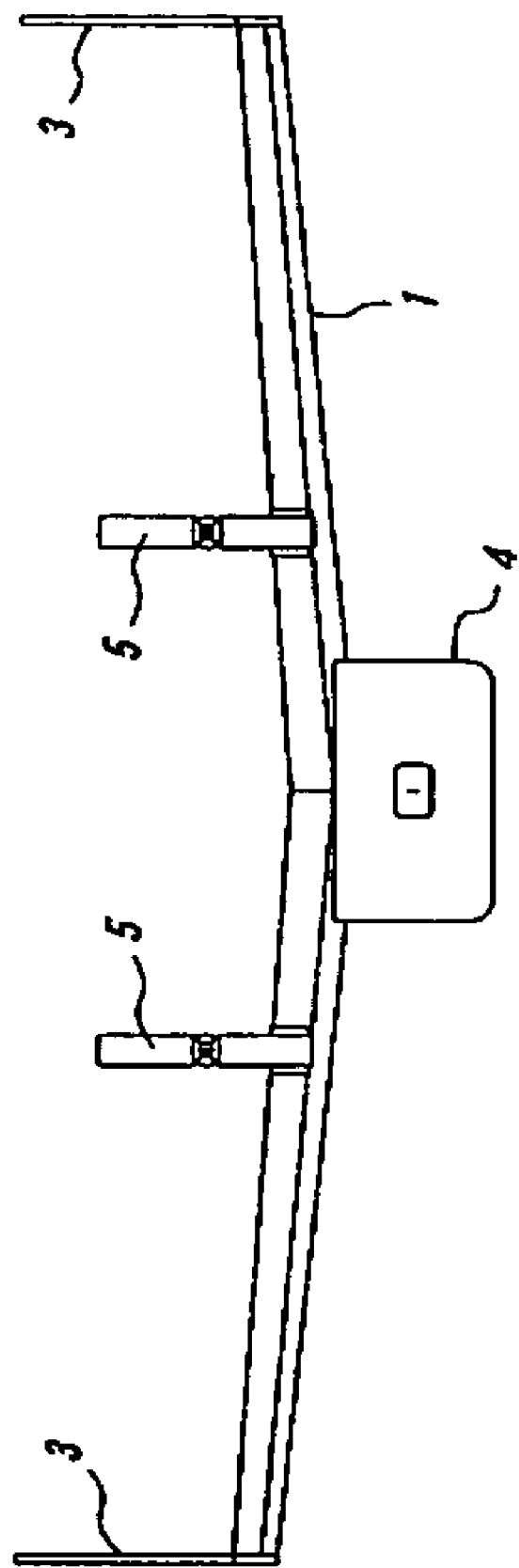
FIG. 3 depicts a front view showing the small unmanned airplane of the above-mentioned embodiment.
Figure 4:
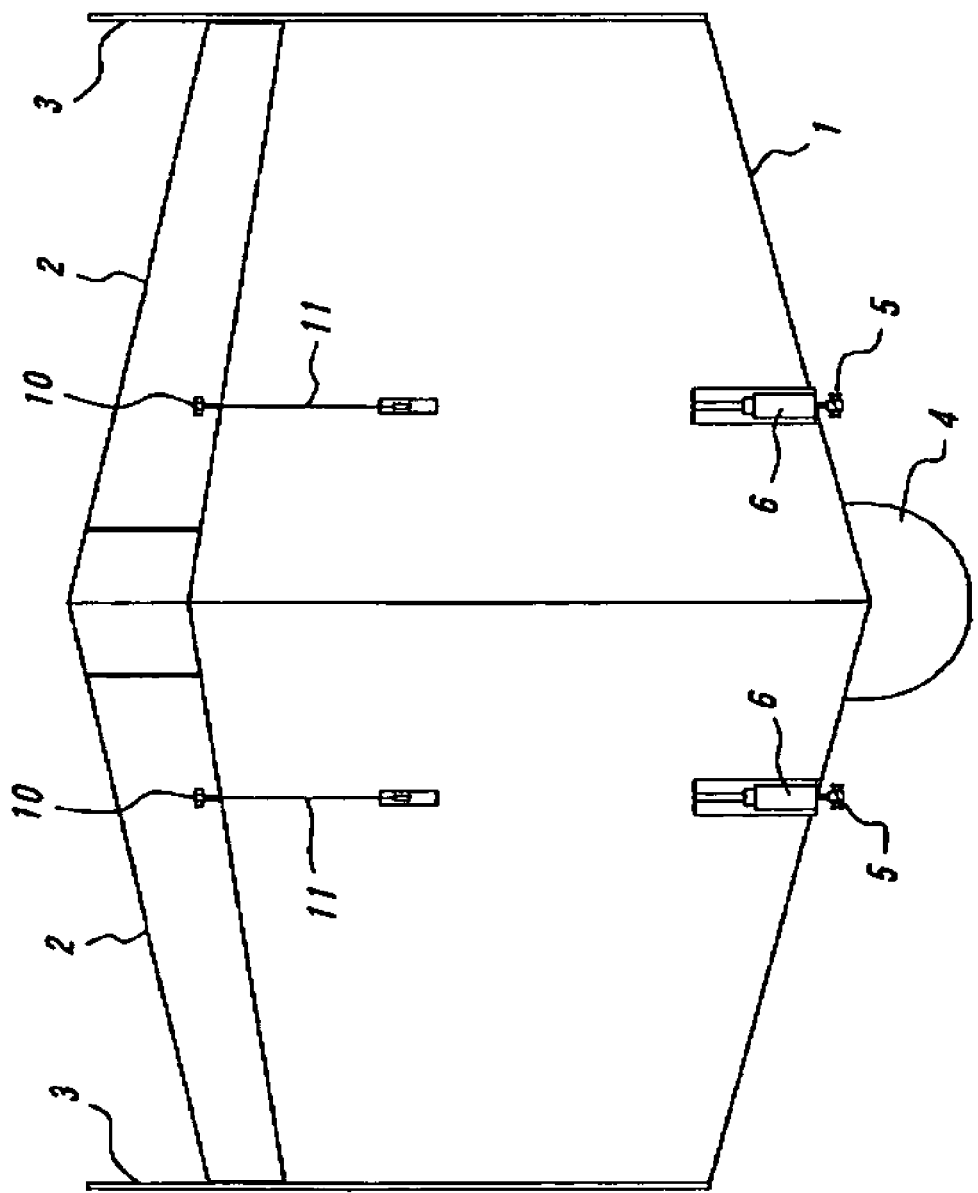
FIG. 4 depicts a top view showing the small unmanned airplane of the above-mentioned embodiment.
Figure 5:
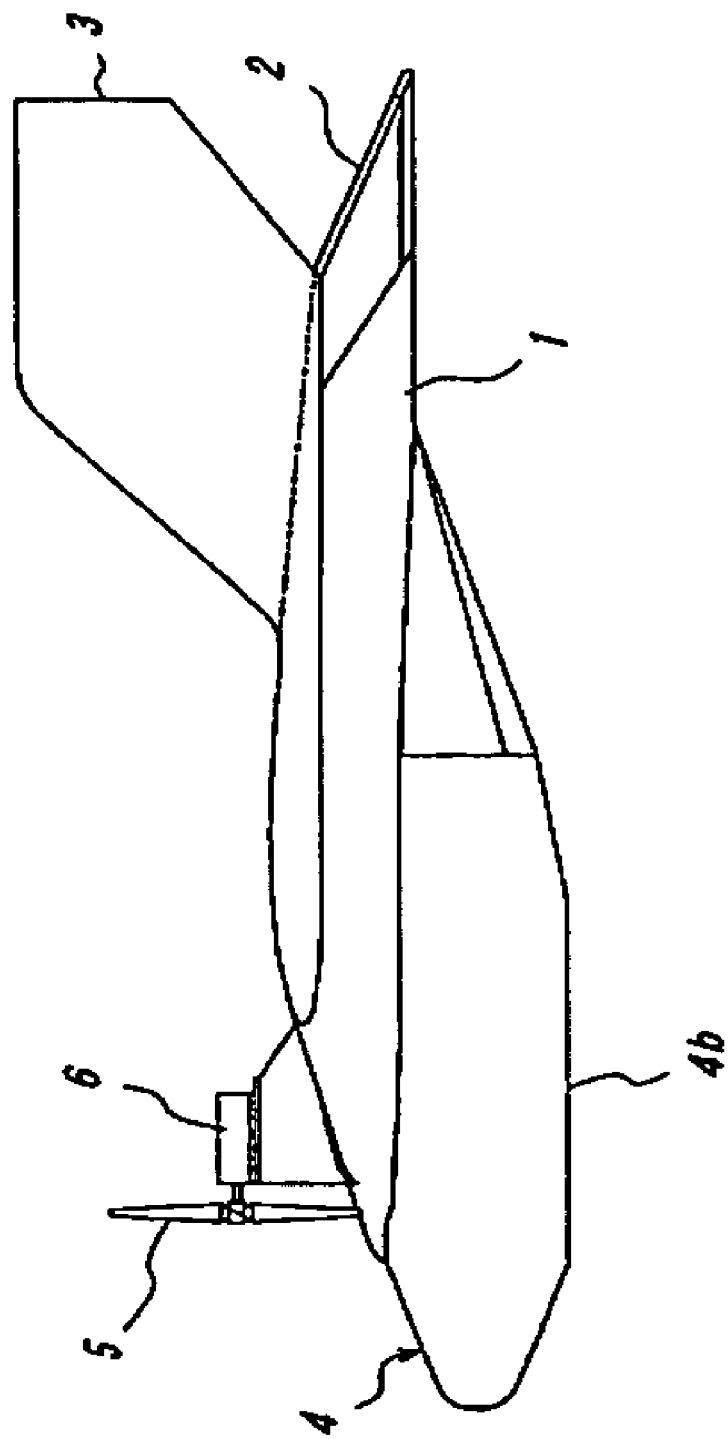
FIG. 5 depicts a side view showing the small unmanned airplane of the above-mentioned embodiment.
Figure 6:
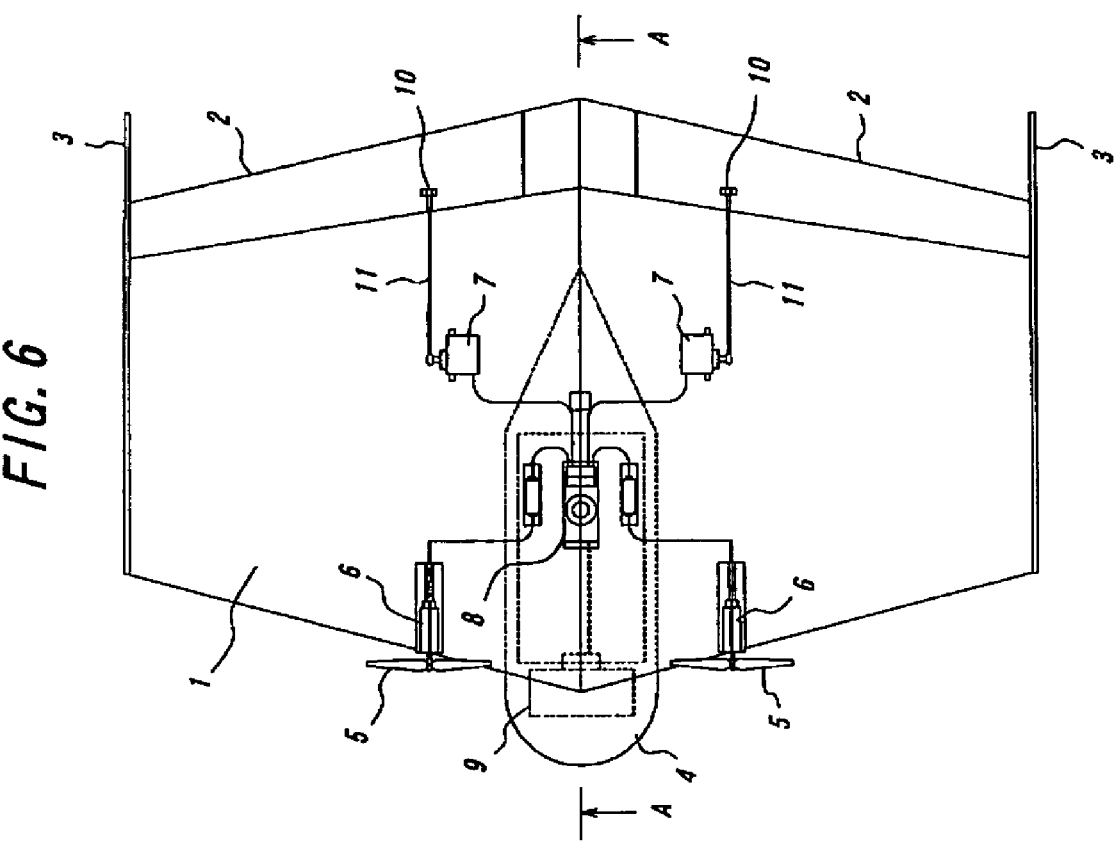
FIG. 6 depicts an explanatory drawing showing the control system of the small unmanned airplane of the above-mentioned embodiment.

The present invention will be further described below in detail with reference to the preferred embodiments shown in the accompanying drawings. In here, FIG. 1 depicts a perspective view showing one embodiment of the small unmanned airplane of the present invention seeing from a diagonal front and upper point. FIG. 2 depicts a perspective view showing the small unmanned airplane of the above-mentioned embodiment seeing from a diagonal rear and lower point. FIG. 3 depicts a front view showing the small unmanned airplane of the above-mentioned embodiment. FIG. 4 depicts a top view showing the small unmanned airplane of the above-mentioned embodiment. FIG. 5 depicts a side view showing the small unmanned airplane of the above-mentioned embodiment. FIG. 6 depicts an explanatory drawing showing the control system of the small unmanned airplane of the above-mentioned embodiment. FIG. 7 depicts a perspective sectional view along the line A-A of FIG. 6 showing the control system of the small unmanned airplane of the above-mentioned embodiment. FIG. 8(*a*) and FIG. 8(*b*) depict perspective sectional views showing respectively the blade cross-sectional shape of the middle part and of a blade tip of the main wing of the small unmanned airplane of the above-mentioned embodiment FIG. 1 is a perspective view seeing from the diagonal front and from the upper point showing one embodiment of a small unmanned airplane according to the present invention.

The small unmanned airplane (or the drone) of this embodiment as shown in FIG. 1 and FIG. 6, includes a main wing 1, two movable flaps 2 of left and right, two vertical stabilizers 3 of left and right, a fuselage 4, two propellers 5 of left and right as propulsion means, two motors 6 of left and right, two servomotors 7 of left and right, a receiver 8 for radio control and a battery 9. The main wing 1 in here, which is flying wing type, has a camber airfoil form whose under surface is almost flat, and narrows in the shape of taper to a blade tip, whose leading edge holds sweepback angle, and is low aspect ratio and has aerodynamic surface of tailless airplane type (for example, NACA2408 correcting type).

And the two movable flaps 2 of left and right extend approximately extreme breadth in both left and right sides of trailing edge part of the main wing 1, and each are coupled the leading edge to the main wing 1 by not shown hinges so that each can raise and lower, and two vertical stabilizers 3 of left and right are vertically provided at the position near posterior of left and right blade tips of the main wing 1.

The fuselage 4 is formed the whole from Styrofoam as a buffer material, and as shown in FIG. 6 and FIG. 7, the fuselage 4 is formed a storing bay 4a in the interior, and is fixed detachably at the middle part of the under surface of the main wing 1. A bottom 4b of the fuselage 4, as shown FIG. 2 and FIG. 5, is formed in the shape of single skid which rises in front and rear and is generally flat at the middle part between them.

Two propellers 5 of left and right are coupled to output shafts of two motors 6 of left and right, and are rotationally driven by those motors 6, and cause a thrust by rotating in a same direction each other (counterclockwise direction as seeing from a point in front of the main wing). Further in here, rotation axes of those two propellers 5, for the frontal direction of the main wing 1, face to slightly diagonal left seeing from a point in front of the main wing so that propeller wake flow is directed to a diagonal right direction seeing from a point in front of the main wing.

On the other hand, as shown in FIG. 1, levers 10 are vertically provided respectively on the two movable flaps 2 of left and right, and tops of those levers 10 are coupled with one ends of connecting rods 11, and the other ends of those rods 11 are coupled with predetermined holes offsetting from center to radial direction of cranks fixed at output axis of two servomotors 7 each laid in left and right sides of the main wing 1, and each of servomotors 7 rotates the crank by the output shaft, then the crank pushes and pulls a lever 10 on a movable flap 2 through the connecting rod 11, and makes swing a movable flap 2 for upper and lower direction at an angle associating with rotating angle of the crank. Thus, two movable flaps 2 are raised and lowered independently each other.

The two motors 6 of left and right and the two servomotors 7 of left and right, as shown in FIG. 6 and FIG. 7, are connected to the receiver 8 contained in the storing bay 4a in the interior of the fuselage 4, and with the receiver 8, are fed from the battery 9 mounted in the interior of the fuselage 4, and move based on control signals given by radio waves from a radio controller which is not illustrated. Especially, two servomotors 7 of left and right give two movable flaps 2 of left and right a dihedral angle at least in level flight.

As well, the main wing 1 in here, as shown in FIGS. 8(a) and 8(b) for the wing cross-sectional shape of the main wing middle and of the main wing tips, has the cross-sectional shape which is the similar figure from the wing root part (middle part) to the blade tip and narrows linearly in the shape of taper from the wing root part to the blade tip.

The small unmanned airplane of this embodiment, for example, takes off by means of such as lift-off by hand throw or with a launcher, gets a thrust by the propellers 5, stabilizes a direction by vertical stabilizers 3, performs such as ascent and descent and turning by means of actuation of flaps 2 and by means of adjustment of a thrust of the propellers 5, and lands or alights on the water by means of belly-landing.

Therefore, according to the small unmanned airplane of this embodiment, free flight is possible by radio control, besides, by having the main wing 1 of flying wing type of low aspect ratio, the over-all length shortens, and the extreme breadth is stayed. Thus, it can materialize miniaturization and weight saving for individual carrying capability and for suitability for such as lift-off by hand throw. In addition, because propellers 5 installed on a top surface of the main wing 1 accelerate air current on the top surface of the main wing 1, big aerodynamic lift can be obtained. Furthermore, because movable flaps 2 having a dihedral angle at least in level flight turn the air current to the backward and obliquely upward, a head lowering moment at the time of thrust increase matches with a back lowering moment, and flight stability of the airframe can be improved.

In addition, according to the small unmanned airplane of this embodiment, because of having a main wing 1 of flying wing type which has a low aspect ratio by narrowing in the shape of taper to a blade tip and holding at the leading edge a sweepback angle, a stall can be restrained when elevation angle of the airframe grew big, and aerodynamic stability can be obtained easily when gust or rapid control of the airframe occurs. And because the main wing 1 has camber airfoil form whose under surface becomes approximately flat, it makes a glide in landing or alighting on the water smooth and can prevent the damage of the airframe effectively.

Furthermore, according to the small unmanned airplane of this embodiment, because the main wing 1 has a dihedral angle in left and right part for the middle, lateral-stability of the airframe can be obtained and when an attitude angle of bilateral direction of the airframe declines in landing or alighting on the water, a touch-down and alighting on the water from a blade tip part can be avoided and the damage of the airframe can be minimized.

In addition, according to the small unmanned airplane of this embodiment, because the main wing 1 has a cross-sectional shape which is a similar figure from a wing root part (middle part) to a blade tip and narrows linearly in the shape of taper from a wing root part to a blade tip, at the time of manufacturing the main wing 1, preparing of only actual shape gages of a cross section of a wing root part and a cross section of a blade tip part enables to form aerofoil surfaces with straight lines binding those gages radiatively. Thus, for example, when main structure materials of an interior of the wing are such as Styrofoam, the main wing can be easily cut and brought down with a heat wire cutter. In addition, pasting of such as vinyl polymers film to a surface of a structural material cut and brought down as a stiffener of the main wing 1 can be performed easily.

Furthermore, according to the small unmanned airplane of this embodiment, because the flaps are movable flaps 2 and the propellers 5 are installed at left and right of the top surface of the main wing 1, by control of an angle of the movable flaps 2 of left and right, ascent and descent flight are attained by control of an attitude angle of a pitching direction of the airframe by means of raising and lowering the movable flaps 2 of left and right in a same direction at the same time, and direction turning is attained by control of an attitude angle of a rolling direction of the airframe by means of raising and lowering the movable flaps 2 of left and right in a reverse direction each other at the same time. And, by associating control of the movable flaps of left and right 2 and control of a thrust of the propellers 5 of left and right, an unmanned airplane having higher mobility, having high flight performance or having high controllability, can be realized.

Furthermore, according to the small unmanned airplane of this embodiment, the propulsion means are propellers 5 which are rotationally driven by means of a drive source, and the propellers 5 are placed so that the lowest point of the revolution of the propellers 5 is higher than an under surface of the main wing 1, therefore the propellers 5 do not protrude in the under surface of the main wing 1. Thus, in landing or alighting on the water, the propellers 5 can be avoided touching grass or ground or water surface and the damage of the airframe can be minimized.

Figure 9:
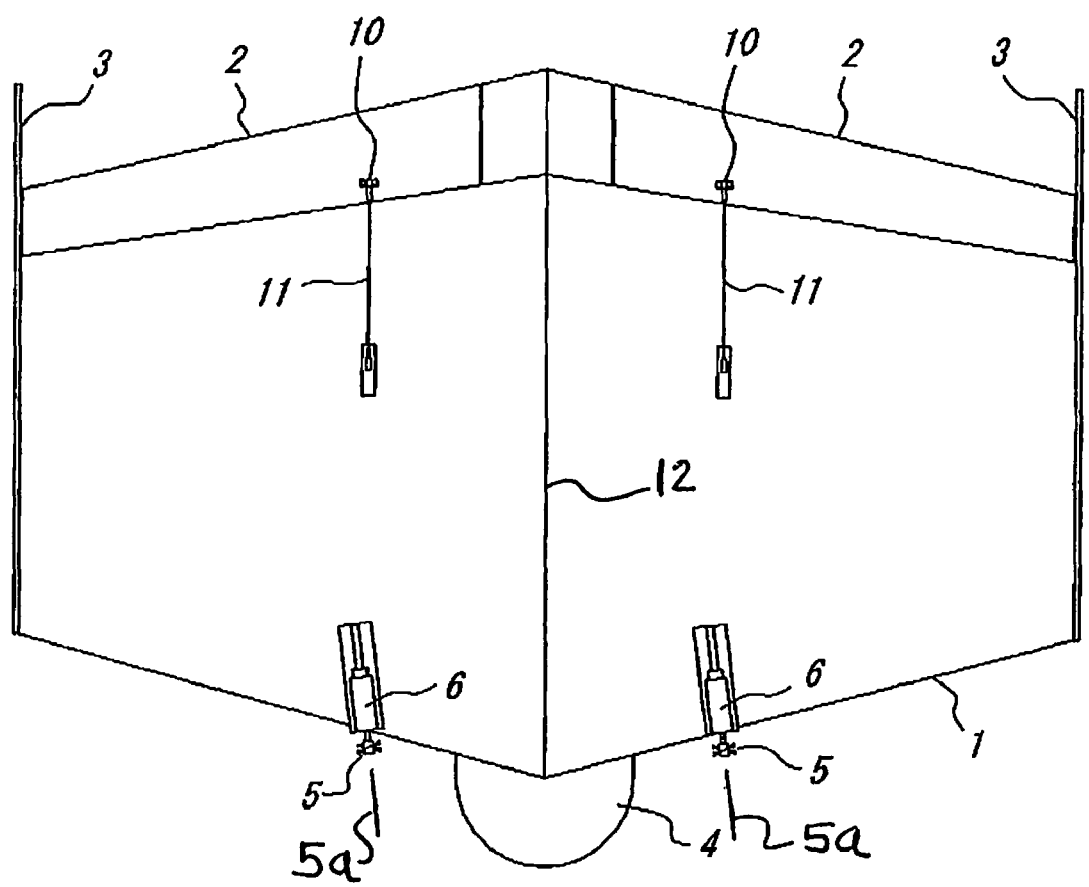
FIG. 9 is a plan view of the airplane shown in FIG. 1, with the angular orientation of the propulsion units exaggerated for purpose of illustration.

Referring to FIG. 9, the angle between the rotation axis 5a of each propeller 5, and the longitudinal axis 12 of the aircraft 1 is exaggerated for purpose of illusration. The rotation axes of two propellers 5 which rotate both counterclockwise seeing from a point in front of the main wing, for a frontal direction of the main wing 1, face to diagonal left, therefore, slippages of the propeller wake flow on the top surface of the main wing 1 by twist of the flow of each propellers 5 are corrected, those propeller wake flows can be turned to just behind and can be subjected to the two movable flaps 2 effectively.

Furthermore, according to the small unmanned airplane of this embodiment, because the fuselage 4 extending in anterioposterior is placed at the middle part of the under surface of the main wing 1, the storing bay 4a is formed in the interior of the fuselage 4 and the bottom 4b of the fuselage 4 is formed in the shape of a skid, such payloads as batteries, a control computer, various kinds of sensors, and/or a camera can be stored in the storing bay 4a of the interior of the fuselage, besides, the effective surface for a touch-down or for alighting on the water can be formed by bottom of fuselage 4b whose form is a single skid, it makes a glide in landing or alighting on the water smooth and can prevent the damage of the airframe effectively.

And, according to the small unmanned airplane of this embodiment, because the whole fuselage 4 is made from Styrofoam as a buffer material, shock in landing or alighting on the water can be absorbed and the damage of the airframe can be prevented effectively.

An explanation has been given based on the illustrated examples, however, the present invention is not limited by the above-mentioned examples. For example, the flap may be a fixed flap, and the propulsion means may be installed at left and right of the top surface of the main wing. With this constitution, by adjustment of a thrust of the propulsion means, flight control is enabled. In other words, by control of a thrust of the propulsion means of left and right, ascent and descent flight are attained by increase and decrease of the total thrust and direction turning is attained by difference of the thrust of left and right. This can realize high mobility without need to equip such as actuator mechanisms for steering. Therefore, components of the airframe can be minimized, and a more small and light unmanned airplane can be constituted.

Furthermore, in the present invention, for example, the vertical stabilizer may be set up at the middle part of the top surface of the main wing, and the propulsion means may be an exhaust outlet of a small jet engine or a small rocket engine. In addition, in the present invention, for example, a bottom of the fuselage may be covered with a film of abrasion resistance and so on. With this constitution, a damage of the airframe can be prevented effectively in landing or alighting on the water.

And, in the present invention, not radio control, a control computer mounted in the airframe may control such as propulsion means and movable flaps by means of determination of such as the attitude and the position of the airframe based on such as the location data from GPS satellites and information from the various sensors mounted in the airframe similarly, thereby flying autonomously may be carried out.

INDUSTRIAL APPLICABILITY

Thus, according to the present invention, it can materialize miniaturization and weight saving of a small unmanned airplane of remote-control type by such as radio guidance or of autonomy type used for such as watching, observation or communication relay, for individual carrying capability and for suitability for such as lift-off by hand throw.

What is claimed is:

1. An unmanned airplane that may be carried by a single person and having a longitudinal axis comprising:
    a main wing having an aerodynamic surface and no tail;
    a left flap and a right flap for an attitude control on the left and right sides of the trailing edge of the main wing; and
    at least two propulsion units each having a motor and a propeller and mounted on a top surface of the front of the main wing, with the propeller positioned in front of the leading edge of the main wing, with each propulsion unit creating a wake flow over a top surface of the main wing:
    wherein the airplane is unmanned and capable of landing on water, and the propulsion units are adapted to create thrust with the propellers of the propulsion units rotating in the same direction and having generally parallel rotation axes each oriented at a fixed angle with respect to the longitudinal axis of the airplane in the horizontal plane, such that the rotation axes are not parallel to the longitudinal axis of the airplane.

2. The unmanned airplane of claim 1 wherein the main wing has a dihedral angle.

3. The unmanned airplane of claim 1 wherein said main wing has a generally uniform cross-sectional shape that tapers linearly from the wing root to the wing tip.

4. The unmanned airplane of claim 1, wherein the flap is fixed and the propulsion units comprise first and second propeller motors on the left and right sides of a top surface of the main wing.

5. The unmanned airplane of claim 1, wherein the flap is movable and the propulsion units comprise first and second propeller motors on the left and right sides of a top surface of the main wing.

6. The unmanned airplane of claim 1 further comprising a fuselage below the main wing, with storage compartment within the fuselage and a bottom surface of the fuselage formed into a skid.

7. The unmanned airplane of claim 6 wherein at least a bottom of the fuselage comprises a buffer material.

8. The unmanned aircraft of claim 1, wherein the left and right flaps are adapted to be raised/lowered independently of each other.

9. An unmanned aircraft that may be carried by a single person comprising:
    a main wing having a leading edge and a trailing edge;
    left and right flaps in the left and right sides, respectively, of the trailing edge of the main wing;
    at least two propulsion units, with each propulsion unit having a motor and propeller mounted on a top surface of the main wing, with the propeller positioned in front of the leading edge of the main wing, with the rotation path of the propeller entirely above the top surface of the main wing;
    a fuselage attached to a bottom surface of the main wing, with a storage compartment within the fuselage and a bottom surface of the fuselage formed into a skid; and wherein the propellers spin in the same direction;

and the aircraft has a longitudinal axis and the propellers each have a rotation axis, and the rotation axes of the propellers are parallel to each other and oriented at a fixed angle with respect to the longitudinal axis of the aircraft in the horizontal plane, such that the rotation axes of the propellers are not aligned with the longitudinal axis of the aircraft.

10. The unmanned aircraft of claim 9 wherein the main wing forms a dihedral angle and the aircraft has no tail.

11. The unmanned aircraft of claim 9 wherein the main wing has a generally uniform cross-sectional shape that tapers substantially linearly from the wing root to the wing tip.

12. The unmanned aircraft of claim 9, wherein the flaps are adapted to be raised/lowered independently of each other.

13. A remotely controlled aircraft that may be carried by a single person comprising:
- a main wing having a left side, a right side, a leading edge and a trailing edge;
- with the left side and the right side of the wing together forming a dihedral angle;
- at least one vertical stabilizer on the main wing;
- left and right flaps at the trailing edge of left and right sides of the main wing;
- a left side propulsion unit having a motor and a propeller and mounted on a top surface of the left side of main wing, with the propeller positioned in front of the leading edge of the main wing, and the left side propulsion unit adapted to create thrust along a fixed first axis;
- a right side propulsion unit having a motor and a propeller and mounted on a top surface of the right side of main wing, with the propeller positioned in front of the leading edge of the main wing, and the right side propulsion unit adapted to create thrust along a second axis; and
- wherein the propellers spin in the same direction
- a fuselage joined to main wing and having a longitudinal axis and with a storage compartment within the fuselage and a bottom surface of the fuselage formed into a skid;
- and with the first axis generally parallel to the second axis, and not parallel to the longitudinal axis of the fuselage in the horizontal plane.

14. The aircraft of claim 13 with the main wing having a generally uniform cross-sectional shape that tapers substantially linearly from the wing root to the wing tip.

15. The unmanned aircraft of claim 13, wherein the flaps are adapted to be raised to project above the main wing, and lowered to project below the main wing, independently of each other.

* * * * *